United States Patent
Umierski et al.

(10) Patent No.: US 7,681,564 B2
(45) Date of Patent: Mar. 23, 2010

(54) VEHICLE PISTON INTERNAL COMBUSTION ENGINE COMPRISING AN ADAPTED RECESS

(75) Inventors: Markus Umierski, Stolberg (DE); Bertold Hüchtebrock, Herzogenrath (DE)

(73) Assignee: FEV Motorentechnik GmbH, Aachen (DE)

( * ) Notice: Subject to any disclaimer, the term of this patent is extended or adjusted under 35 U.S.C. 154(b) by 206 days.

(21) Appl. No.: 11/814,263

(22) PCT Filed: Jan. 7, 2006

(86) PCT No.: PCT/EP2006/000081

§ 371 (c)(1),
(2), (4) Date: Feb. 5, 2008

(87) PCT Pub. No.: WO2006/077019

PCT Pub. Date: Jul. 27, 2006

(65) Prior Publication Data

US 2008/0276900 A1    Nov. 13, 2008

(30) Foreign Application Priority Data

Jan. 19, 2005    (DE) ........................ 10 2005 002 389

(51) Int. Cl.
*F02B 23/08* (2006.01)
(52) U.S. Cl. .................... 123/661; 123/671; 123/193.6; 123/301; 123/305
(58) Field of Classification Search ............. 123/193.6, 123/301, 305, 661, 671
See application file for complete search history.

(56) References Cited

U.S. PATENT DOCUMENTS

| | | | |
|---|---|---|---|
| 4,543,929 A | 10/1985 | Kataoka et al. | |
| 4,669,431 A * | 6/1987 | Simay | 123/193.6 |
| 4,763,622 A * | 8/1988 | Indra et al. | 123/308 |
| 5,390,634 A * | 2/1995 | Walters et al. | 123/193.5 |
| 5,738,057 A * | 4/1998 | Vallejos | 123/193.5 |
| 6,129,066 A | 10/2000 | Umierski et al. | |
| 6,971,379 B2 * | 12/2005 | Sakai et al. | 123/661 |
| 2003/0145823 A1 | 8/2003 | Wirth | |

FOREIGN PATENT DOCUMENTS

EP    0851102    7/1998

(Continued)

*Primary Examiner*—Erick Solis
(74) *Attorney, Agent, or Firm*—Gifford, Krass, Sprinkle, Anderson & Citkowski, P.C.

(57) ABSTRACT

An internal combustion engine has at least one cylinder, wherein in the cylinder there is a piston, which has a recess. Furthermore, the internal combustion engine has a cylinder head, which has the shape of a roof complementary to the roof-shaped geometry of the piston with a first and second side converging in the shape of a gable, with the piston and the cylinder head defining a top side and a bottom side of a combustion chamber. The internal combustion engine has an ignition device, which is arranged at least approximately in the center in the roof shape. The cylinder further has preferably two inlet valves, which are arranged in the first side, and also preferably two outlet valves, which are arranged in the second side. The recess extends past both sides, wherein the recess includes at the side approximately vertically descending sides and a base. The piston further has at least two, preferably four quench zones, which are at least partially separated from each other by valve pockets for valves.

22 Claims, 6 Drawing Sheets

FOREIGN PATENT DOCUMENTS

| | | |
|---|---|---|
| EP | 1589201 | 10/2005 |
| JP | 2002089266 | 3/2002 |
| JP | 2005315166 | 11/2005 |
| WO | WO-2004/067928 | 8/2004 |

* cited by examiner

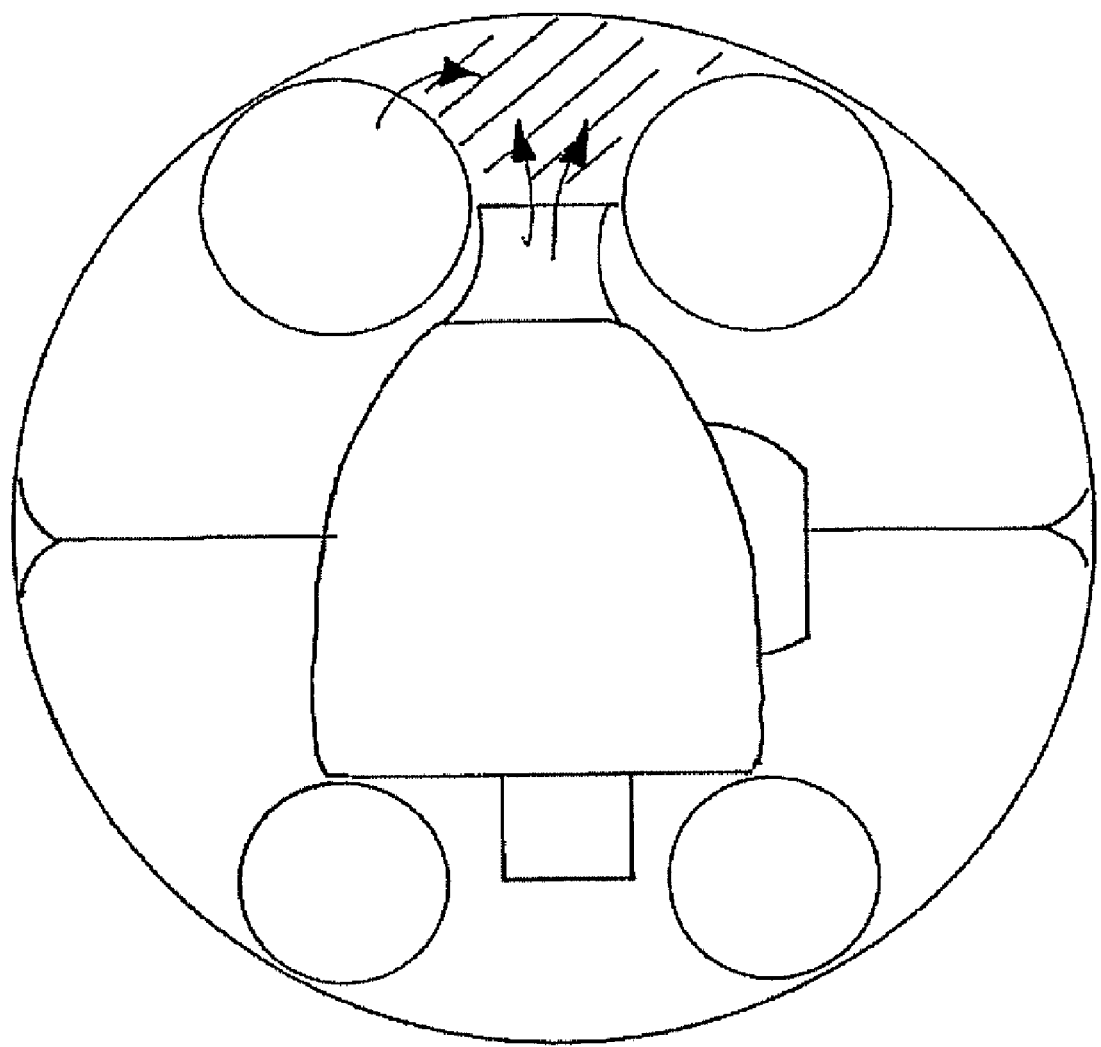
Fig. M

VEHICLE PISTON INTERNAL COMBUSTION ENGINE COMPRISING AN ADAPTED RECESS

CROSS-REFERENCE TO RELATED APPLICATIONS

This application is the United States national phase application of PCT Application No. PCT/EP2006/000081 filed on Jan. 7, 2006 and claiming a priority date of Jan. 19, 2005 from German Application No. DE 10 2005 002 389.4, both of which are incorporated herein by reference.

FIELD OF THE INVENTION

The invention relates to a vehicle piston internal combustion engine with at least one cylinder, with a piston in the cylinder, which has a recess.

BACKGROUND OF THE INVENTION

From U.S. Pat. No. 6,129,066 it is known, for example, in a combustion engine, to provide a piston for a four-valve arrangement with a recess, which is approximately in the center relative to the arrangement of a cylinder spark plug in the cylinder head. The recess further has in the piston a flat geometry and is, in particular, round. Such a piston geometry should be in the position, on the one hand, to reduce the tendency to knock and, on the other hand, should allow improved lean operation with reduced HC emissions. In particular, such a system should be usable for auto-ignition combustion engines.

SUMMARY OF THE INVENTION

The problem of the present invention is to construct a vehicle piston internal combustion engine with an improved combustion procedure adapted for lean operation.

This problem is solved by a vehicle piston internal combustion engine with the features of Claim 1 and also by a combustion process of a vehicle piston internal combustion engine with the features of Claim 18. Other advantageous constructions and refinements are specified in the respective subordinate claims.

A vehicle piston internal combustion engine according to the invention, shortened below as internal combustion engine, has at least one cylinder, wherein in the cylinder there is a piston, winch has a recess. Furthermore, the internal combustion engine has a cylinder head, which has the shape of a roof complementary to the roof-shaped geometry of the piston with a first and second side converging in the shape of a gable, with the piston and the cylinder head defining a top side and a bottom side of a combustion chamber. The internal combustion engine has an ignition device, which is arranged at least approximately in the center in the roof shape. The cylinder further has preferably two inlet valves, which are arranged in the first side, and also preferably two outlet valves, which are arranged in the second side. The recess extends past both sides, wherein the recess includes at the side approximately vertically descending sides and a base. The piston further has at least two, preferably four quench zones, which are at least partially separated from each other by valve pockets for valves.

According to a first construction, a valve pocket completely separates two quench zones. Preferably, a valve pocket has a depth of at least 5 millimeters in a piston surface. According to one refinement, this depth is present directly at one edge of the valve pocket. It can be constant as well as change along the valve pocket. For example, the valve pocket can include a plane with descending or raising surface. Also, the valve pocket can have an edge in at least one area and no edge in a second area. For example, an edge can be arranged in an area extending outwards to a piston skirt. No edge or only a slight edge is provided, for example, in an area bordering the recess.

Furthermore, the depth of the valve pocket can be arranged in a range between 5 millimeters and 15 millimeters. Preferably, the percentage of quench zones to the total surface area of the piston equals between 20% to 40% in a view from above. The percentage call also be lower, however, for example, up to 15%.

Another construction provides that a valve pocket is constructed with sharp edges at least in one flow zone. The edge preferably is not rounded. Instead, the edge can also have turbulence-generating geometries, for example, notches, additional projections, or similar shapes causing a disruption in the flow. The surfaces forming the edge preferably join together at an acute angle between 70° and 90° or at an obtuse angle between 90° and 110°. An at least approximately right angle is preferred.

According to one refinement, an indentation, which extends outwards from the recess preferably up to nearly the piston skirt and which has at least one edge that breaks up a flow, is arranged in the piston base at least next to a valve pocket. This edge can be constructed like the edge of the valve pocket described above. Preferably, the indentation is arranged between a first and a second valve pocket and transitions into a quench zone.

According to another construction, an indentation, which extends outwards from the recess up to the piston skirt and which has at least one edge that breaks up a flow, is arranged in the piston base at least next to a quench zone. The indentation is preferably channel-shaped and arranged at least partially between a first and a second quench zone and preferably transitions at least into one of the quench zones. In particular, the indentation can also rise towards the piston skirt but can have sharp edges at the sides. The indentation can also be completely provided with sharp edges.

With an internal combustion engine as described above, it is possible to achieve very good efficiencies of over 38%, especially for fuels with an ROZ between 95 and 98. In particular, the proposed internal combustion engine for a partial load has an efficiency that lies far above those that had been achievable until now with such internal combustion engines. This is created by the geometry of the combustion chamber, because this allows a high combustion rate. In particular, the internal combustion engine can be used for a very lean operation of, for example, lambda=1.4 to 1.5. Additionally, the internal combustion engine can have pressure charging. Reducing HC emissions can be achieved through better combustion reactions.

Preferably, the internal combustion engine has a roof angle lying between 15 to 25° in the cylinder head. The valves and channels in the cylinder head are constructed such that a tumbling motion is created in the combustion chamber. In particular, a switching device can be provided for this purpose in each channel. The channels can also have partitioning for this purpose. Due to the geometry of the piston and its alignment relative to the valves and channels, in one process a generated tumbling motion is converted into turbulence from BDC [bottom dead center] to TDC [top dead center]. In this way, a flame cone is produced. The center of the flame cone preferably lies in the middle of the recess in the immediate vicinity of the ignition device.

For generating the turbulence from tile tumbling motion, preferably the recess edges are already partially specially shaped, as above. Here, the edges form flow obstacles, which break up the tumbling flow running at least approximately parallel to the crankshaft axis. For example, the edges can also be discontinuous or can form ramp-like sections. Therefore, according to one development, the piston base is especially highly profiled. In this way, the tumbling flow can be broken up, for example, by passing the tumbling flow through the piston recess. In addition, a valve free path is provided by pockets, which are integrated into the piston. The edges of the pockets are also preferably constructed so that they at least support the formation of turbulence from a tumbling motion. Preferably, the valve free path has an indentation, which is deeper by a factor of at least 2 than the minimum required free path. Preferably, the factor is between 2 and 5. For example, a valve pocket has an indentation that equals at least 5 mm.

Preferably, a valve angle is selected so that a tumbling flow is induced for open inlet valves together with the inlet channels. This is supported by the combustion space, in which the recess projects deep into the roof-shaped piston. According to one development, the recess should have a depth of at least 10% of the cylinder diameter, preferably at least 15%. According to one refinement, the depth is at least 18% of the cylinder diameter, preferably at least 20%. For example, the recess has a depth of 20 mm for a cylinder diameter of 80 mm. Preferably, the recess is arranged approximately in the center in the piston. In this way, it is possible that the recess can support the formation of turbulence from the existing tumbling motion during an upward motion of the piston.

Through the central location of the recess, it is further guaranteed that the combustion space formed in TDC is concentrated around the spark plug arranged in the center in the cylinder head. In this way, the flame paths in the combustion space are kept short. This is supported in that the piston contours form quench zones together with the cylinder head in TDC. Preferably, due to a necessary valve free path at TDC with a pronounced valve overlap, the resulting quench zone is divided into at least two partial areas, but preferably into four partial areas. For partitioning into two partial zones, specifically the inlet valves are separated from the outlet valves. For partitioning the quench zone into four partial zones, the areas of all four valves are separated from each other. Preferably, the size of the quench zone can vary from 5% to 40% relative to a projected piston surface area. The projected piston surface area is the circular area of a cylinder borehole. In particular, the quench zone can be designed so that it correlates with the tumbling level to be achieved. For a tumbling level of 4, a quench zone in a range from 25% to 35%, especially of 30%, has proven to be advantageous.

The tumbling level is given as the result of a calculation of the tumbling factor. The tumbling factor $c_T/c_A$ is given as a velocity of a tangential velocity of a cylinder change as a ratio to an axial velocity. This is determined by quantifying the inlet-side generated tumbling motion in a stationary flow test via the rotational speed of a central impeller wheel receiving a force in a model cylinder. The test setup and also the calculation parameters for the tumbling factor and thus the tumbling level are known (G. Thien: Development work on valve channels of four-stroke diesel engines, Österreichische Ingenieurzeitschrift [Austrian Engineering Journal], 8/65, pg. 291). In the scope of this disclosure, this document is referred to in its full extent with regard to determining the tumbling factor.

According to one development, a quench level in TDC is less than 1 mm, preferably between 0.5 mm to 0.7 mm. Here, a free section for the existing valves equals at least 5 mm. In this way it is possible that a flame in TDC also allows combustion. In particular, the free section is designed so that, according to one development, the flame can penetrate into the formed gap at all operating times, the gas there combusts, and therefore auto-ignition processes are prevented.

According to one refinement, for a supporting function, a transition to a quench zone is approximately angular, with as little rounding of the meeting planes as possible. In this way it is possible to be able to use a so-called squish effect and a so-called reverse-squish effect. If the piston moves opposite TDC very close to the cylinder head, the gas in the combustion chamber is forced into the recess in the piston base. Therefore, high gas velocities and corresponding mixing effects are produced in the recess. When the reverse-squish effect is used, that is, for the reverse motion of the piston and the accompanying downwards movement from TDC to BDC, the gas is suctioned into the gap. This suctioning allows, in particular, the flame to reach the quench zone quickly. Through this type of geometry and especially the construction of the quench zone, it is possible that the flame path there can be kept short.

First, it is preferred that an outflow from the gap between the quench zone and the piston roof reach its maximum velocity between 23° and 10° before TDC. Second, it is preferred that an inflow into the gap between the quench zone and the piston roof reach its maximum velocity between 10° and 23° after TDC.

Another development provides that an axis running through an outlet valve intersect the piston outside of the recess, while an axis running through an inlet valve intersect at least one edge of the recess. This is set at TDC. Furthermore, a tumbling generation, and thus later advantageous combustion, is supported in that inlet channels, which are parallel to each other and open into the combustion chamber, are assigned to the inlet valves. Outlet channels, which are also parallel to each other and open into the combustion chamber, can also be assigned at least to the outlet valves. This allows the generation of a tumbling motion, which can be broken up into general turbulence in a simplified way.

For continuous conversion of the fuel in the combustion chamber, it is provided, for example, that a fuel inlet device be arranged in the roof shape close to a gable on the outlet-valve side, through which an axis of a fuel inflow runs at an angle so that the axis crosses an ignition device axis in the area of the roof shape in the cylinder head. This arrangement allows a center of the combustion close to the ignition device and especially very compactly in the region of die recess. This is supported especially in that the axis of the fuel inflow is inclined in the direction of the inlet valve. In another development, a piercing point of a fuel inflow, especially a fuel nozzle, is arranged in the combustion space differently, for example, closer to the inlet valve or to the outlet valve. The fuel inflow direction can intersect, incidentally, with an axis of a fuel nozzle. It can also, however, deviate from this axis. Also mixed forms with various directional percentages for injection of the fuel are possible. The fed, especially injected, liquid or flowing gaseous fuel can also be supplied in a timed way, wherein a controller and/or a regulator of the fuel supply takes into account, for example, a load-dependent turbulence produced in the combustion space.

According to another refinement, it is provided that the internal combustion engine is a component of a gas motor. The gas motor can also be operated, for example, in lean operation, wherein, here, a peak pressure of approximately $p_{max}=150$ bar under full load can be reached. However, the peak pressure can also be lower. Preferably, support is realized by means of a charger, for example, a mechanical charger or an exhaust-gas turbocharger. In particular, in interaction between the piston, the cylinder head, and the combustion space formed in this way, a high compression ratio is possible, preferably between 11 and 16. In a gas motor, especially in a gas motor driven with natural gas, a preferred value is approximately 14. For gasoline operation, the preferred compression ratio equals approximately 13. In addition to natural gas, other fuels that can be introduced into the combustion chamber as gaseous fluid can also be used.

The proposed internal combustion engine can also be combined with a fuel injection in the suction pipe in addition to the construction as a direct injector.

According to another concept of the invention, a combustion process of a vehicle piston internal combustion engine is created as proposed above according to the four-stroke principle for solving the problem, wherein a tumbling motion of a flow in a combustion space during a combustion stroke is broken up at least partially into turbulence using edges formed by a recess in a piston base. A turbulent flow achieved in this way is guided into a narrowing gap between the piston roof and quench zones in the piston base, where it is discharged again before reaching TDC. Fuel flows into the gap and back, and in this way is used in a subsequent combustion, in which at TDC a compression ratio between 11 and 16 is set in the combustion space.

Quench surfaces on the piston preferably partition the combustion space, wherein a concentration of the combustion takes place underneath and around the ignition device arranged approximately in the center.

According to one refinement, it is provided that edges of the recess are cooled in a suction stroke by incoming air or a mixture. In particular, by breaking up a directed flow in the form, for example, of an eddy current, a high flow velocity can be achieved. This allows an improved heat exchange, for example, between the edges and incoming cold, fresh gas. Furthermore, according to one development, it is provided that under a partial load, layered charging be set in the combustion space. In this way, an improved combustion process can be allowed, especially in interaction with the recess geometry. Further support is achieved by adding charged air to the combustion chamber. In particular, in this way, lean operation can be performed advantageously.

In addition, an ignition adjuster can be provided. For example, an ignition time under full load is shifted towards a "retarded" position, that is, in a range between 15° to 20° KW [knock value]. In this way, a short combustion with lower NOx emissions can be achieved for a corresponding mixture formation.

BRIEF DESCRIPTION OF THE DRAWINGS

Other advantageous developments and refinements are explained in more detail in the following drawing. However, the features shown and described in the respective developments are not limited to these. Instead, these can be combined with other developments, especially with the features described above, to form refinements. Shown are.

DETAILED DESCRIPTION OF THE PREFERRED EMBODIMENTS

Figure 1:
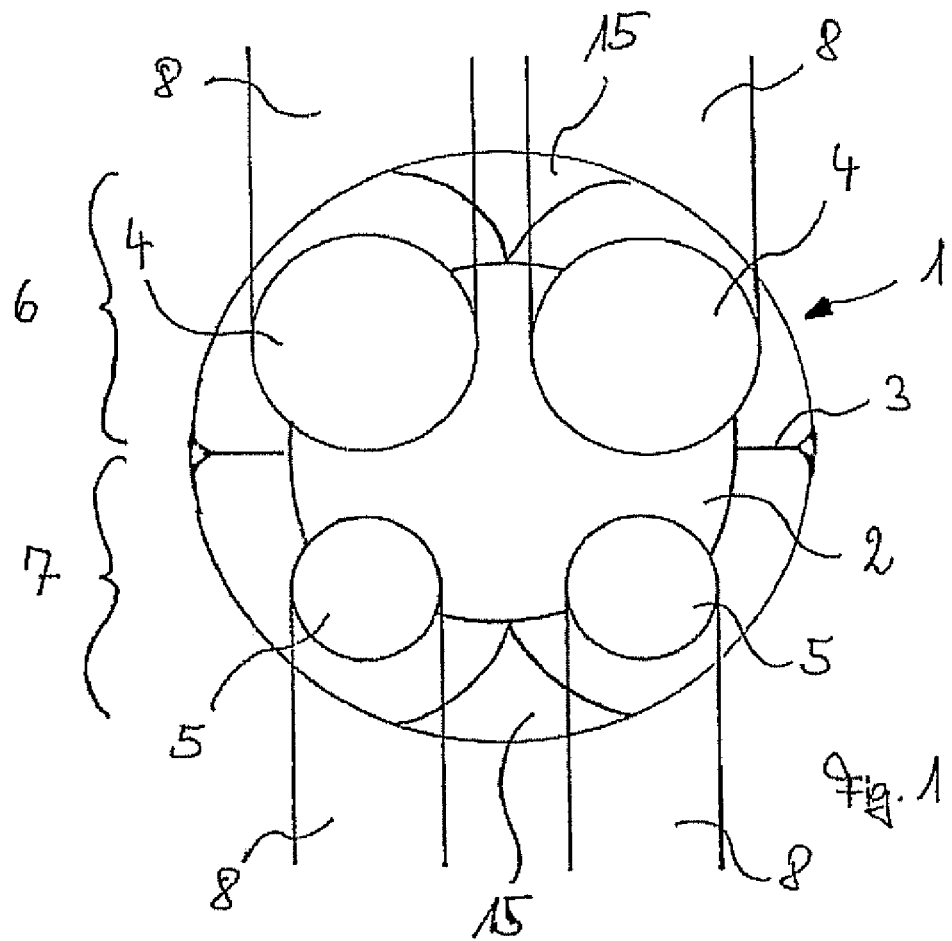
FIG. 1, in a schematic view, a piston with valve channels placed in front.

FIG. 1 shows a schematic view from above onto a piston 1, which has a recess 2 arranged in the center. The piston 1 has a roof-shaped geometry with a gabled edge 3. This edge runs approximately in the center along the piston 1 and separates the outlet valves 4 from the inlet valves 5. The inlet valves 4 are here arranged on a first side 6 and the outlet valves are arranged on a second side 7 of a roof shape (not shown) for a cylinder head of a vehicle piston internal combustion engine. The inlet valves 5 and outlet valves 4 each have channels 8, which run parallel to each other. In particular, the channels of the inlet valves 5 also run parallel to the channels 8 of the outlet valves 4. Furthermore, quench zones 15 are indicated schematically between the valves.

Figure 2:
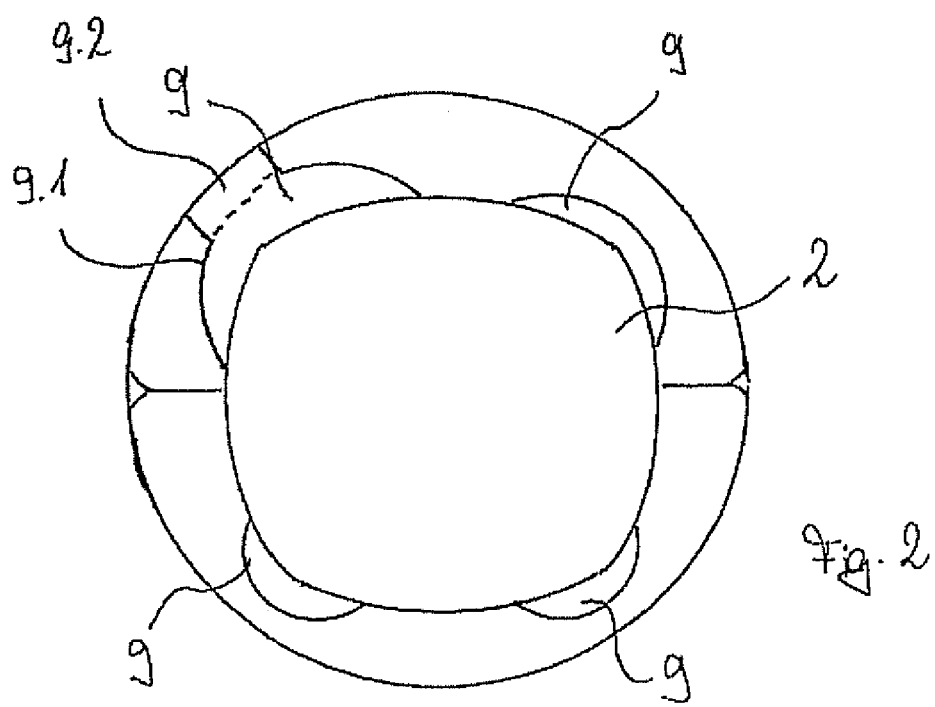
FIG. 2, a top view onto a schematic piston according to FIG. 1.

FIG. 2 shows the piston 1 again in a schematic top view. The recess 2 has free sections 9 for the valves. The free sections 9 for the inlet valves can have the same depth as the free sections for the outlet valves. However, these can also be different. For example, the free sections for the outlet valves can be less deep than the free sections for the inlet valves. The reverse can also be the case. The dimensioning of the free sections 9 can depend especially on how strong the needs are for valve overlap, for example, and thus an opening of the valves, especially at TDC. The free sections 9 can be embedded, especially with sharp edges, into the piston geometry. In this way, they are able to break up a tumbling flow into a generally turbulent, undirected flow. For example, a free section has a valve pocket 9.1, which connects to a recess 9.2. The recess 9.2 exceeds outwards to the piston skirt and is surrounded on the sides by quench zones. The recess 9.2 is embedded with sharp edges into the piston base. At these edges, the tumbling eddy current breaks up and therefore the degree of turbulence increases.

Figure 3:
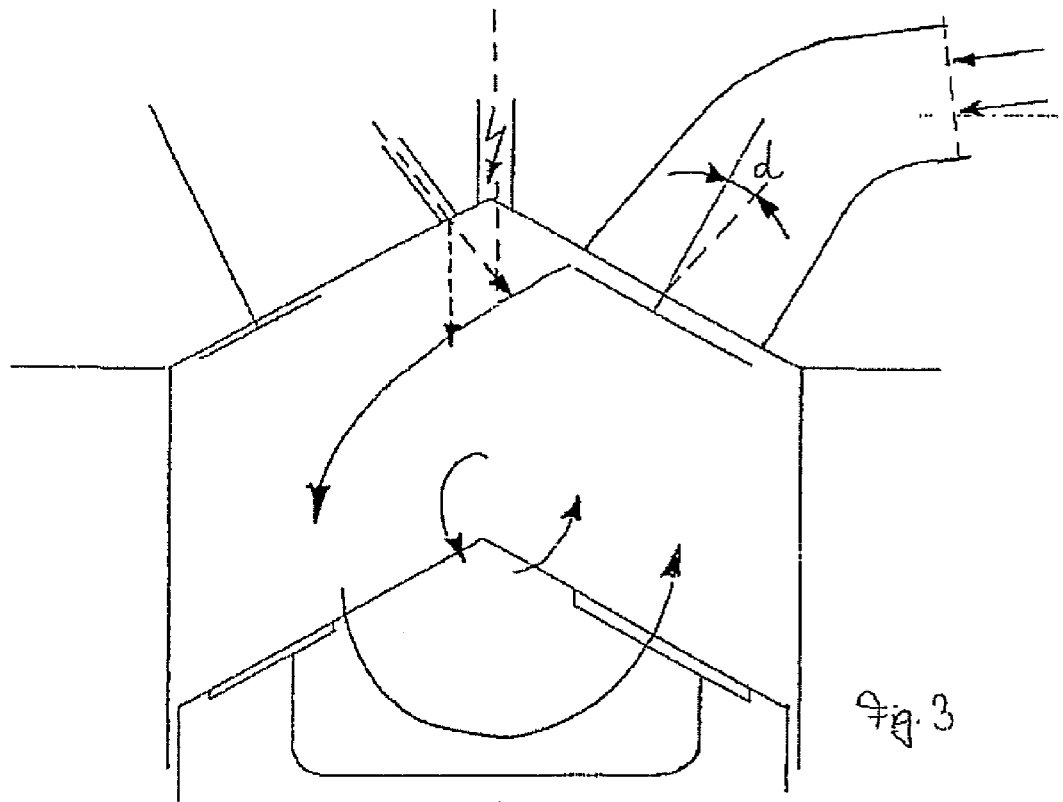
FIG. 3, a schematic view of a vehicle piston internal combustion engine, whose at least one cylinder is shown with a piston in an upward motion from BDC towards TDC, FIG. 4, the piston from FIG. 3 moved farther up, FIG. 5, the piston from FIG. 3 arriving at TDC, FIG. 6, a schematic view of a vehicle piston internal combustion engine together with associated assemblies, FIG. 7, a schematic view of a first gap, FIG. 8, a schematic view of a second gap, FIG. 9, a schematic view of a third gap, FIG. 10, a schematic view from above onto a piston base with a first indentation, and FIG. 11, a schematic view from above onto another piston base with several different indentations.
Figure 4:
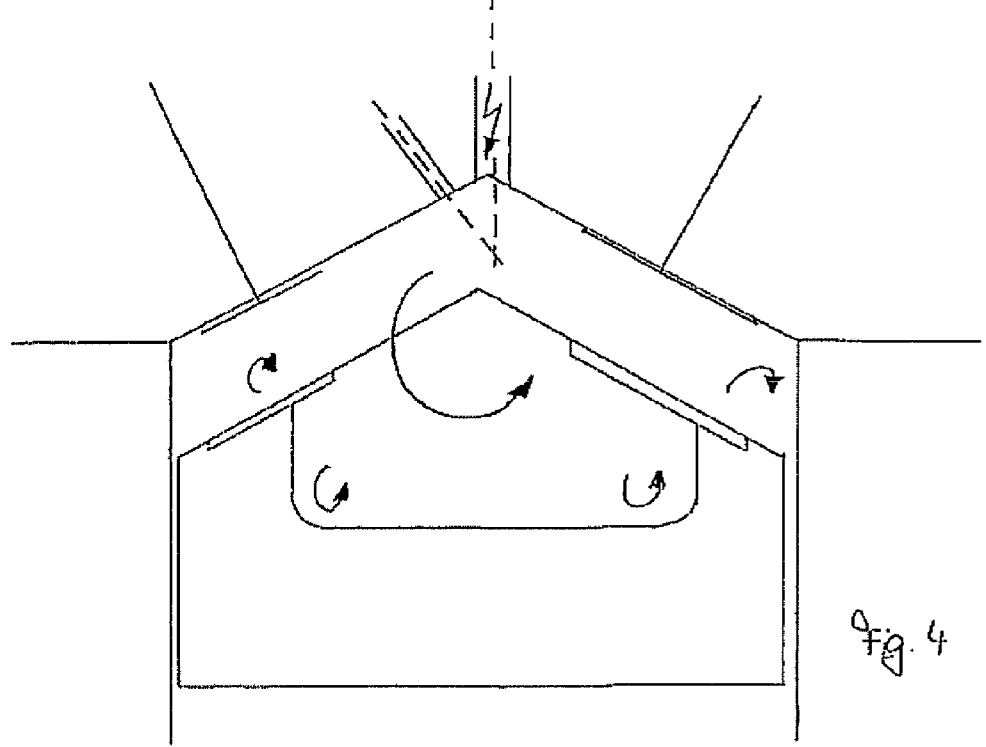
Figure 5:
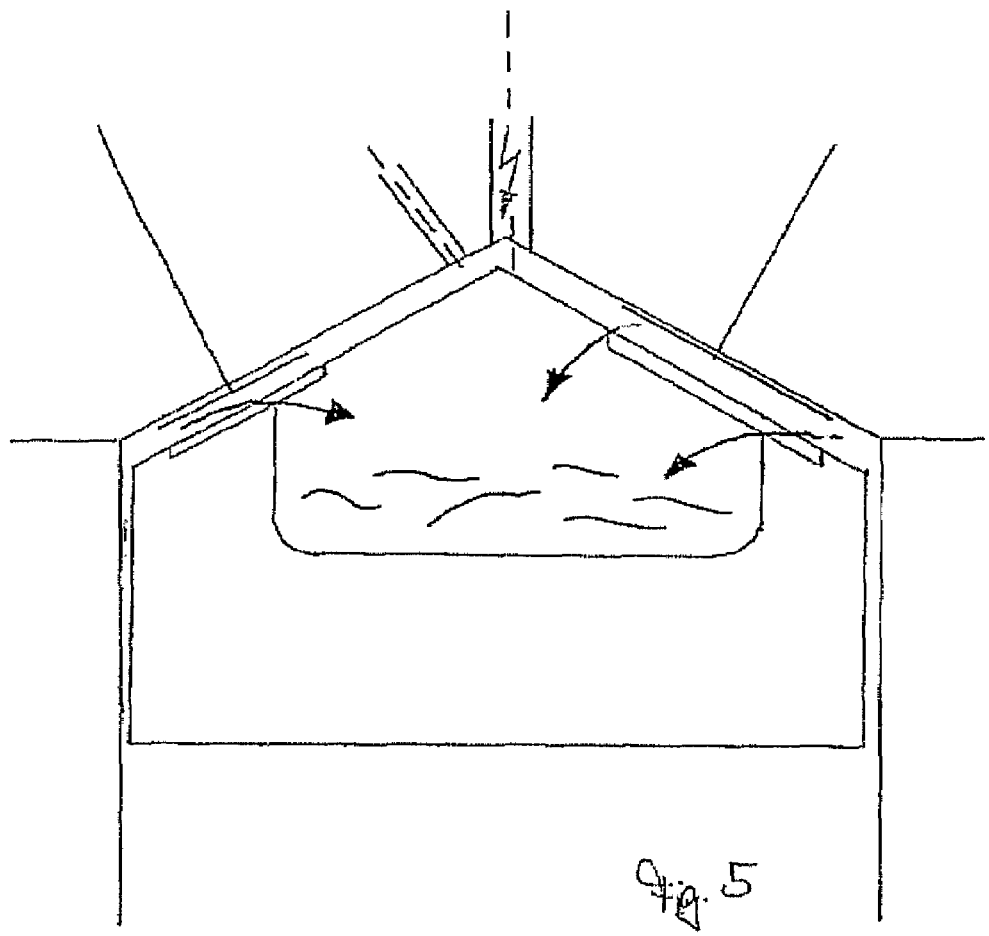

FIGS. 3-5 show a process for generating tumbling. The tumbling is generated, for example, by means of the channel and valve geometry. An angle α between a channel and a valve is defined so that the incoming gas flows tangentially into the combustion space, deflects at an opposite combustion space wall, thereby producing the tumbling motion. With advancing movement of the piston in the direction of TDC, a global tumbling eddy current is broken up into many smaller individual flows due to an edge effect. Therefore, the tumbling eddy current is broken up to a great degree before reaching TDC and the degree of turbulence in the combustion chamber is increased.

Figure 6:
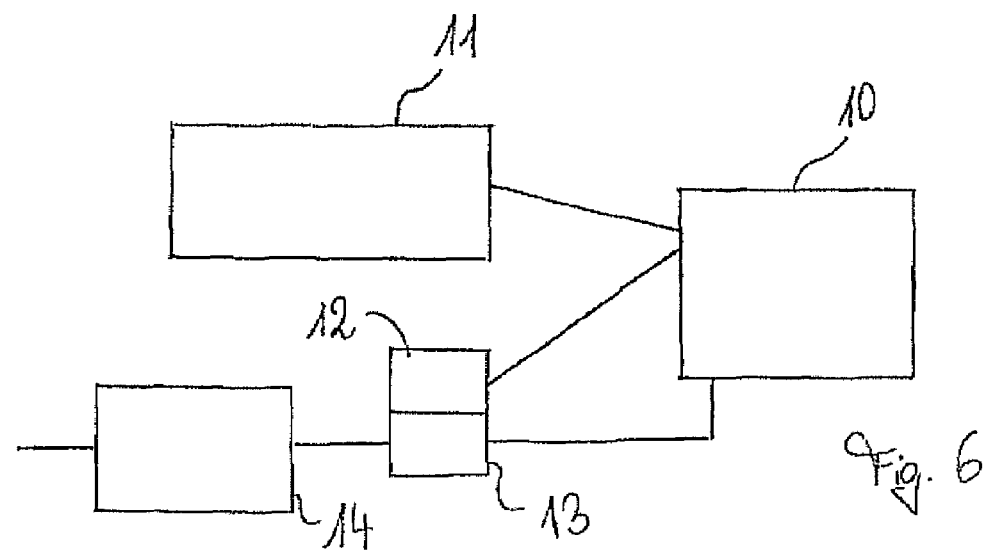

FIG. 6 shows in a schematic view a vehicle piston internal combustion engine 10. For example, via a tank 11, liquid or gaseous combustion fluid is fed to the internal combustion engine 10. For example, gas can also flow directly into the cylinder (not shown in further detail). In addition, air is fed to the internal combustion engine 10 under increased pressure via a charger 12. The charger 12 can be coupled to an exhaust-gas turbine 13, for example, with an exhaust-gas post-processing station 14 following this turbine. The exhaust-gas post-processing station 14 can be, for example, a catalytic converter and/or a particulate filter.

Figure 7:
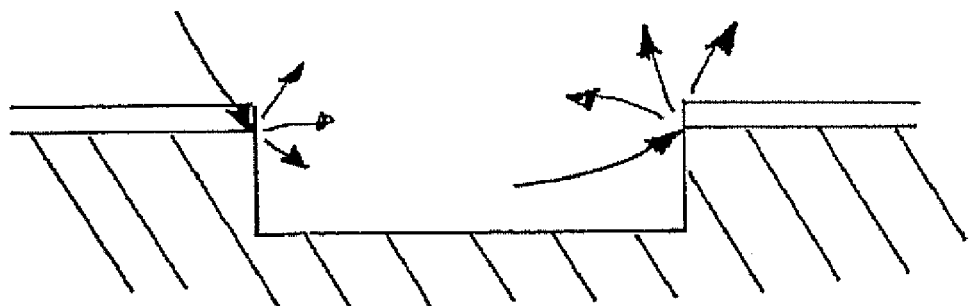

FIG. 7 shows in a schematic view a possible effect of pointed surfaces of, for example, indentations or valve pockets in the piston base, which form an edge, at which the tumbling is broken up. The tumbling is indicated by arrows intersecting the edges. The resulting turbulence is indicated by arrows flowing away from the edge.

Figure 8:
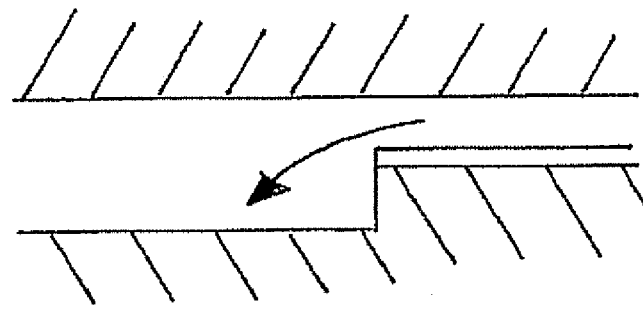

FIG. 8 shows in a schematic view a so-called "squish" flow: before reaching TDC, the fluid located between the piston roof and quench zone flows outwards in the direction of a recess.

Figure 9:
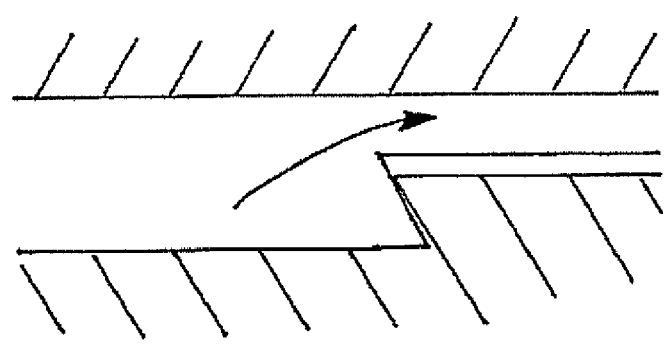

In FIG. 9, a state after TDC is shown in schematic view. Here the fluid flows as a "reverse-squish" flow back into the gap. Also shown in FIG. 9 is that the edge can also be formed by pointed surfaces.

Figure 10:
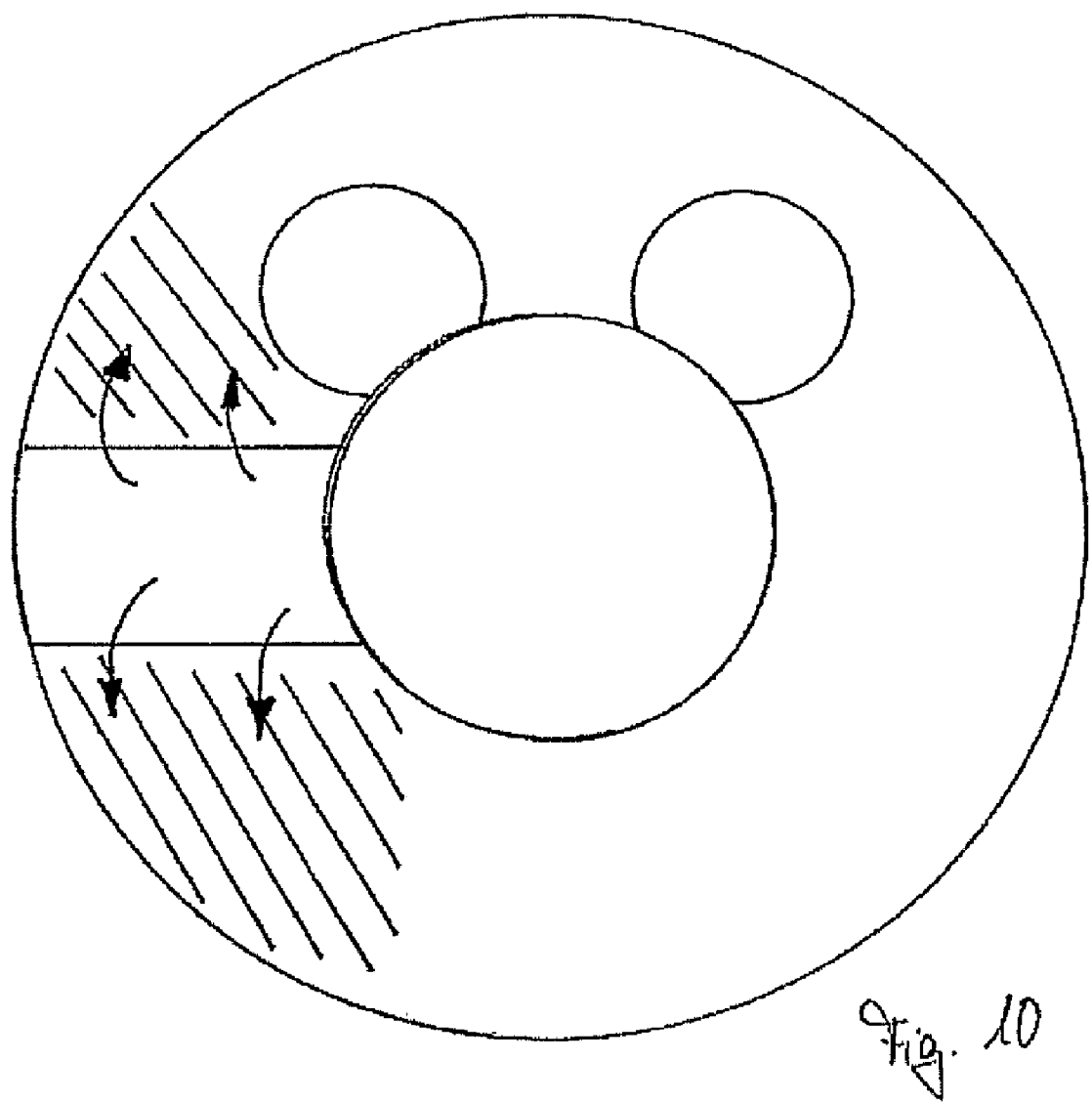

In FIG. 10, as an example, another possibility is specified for how an indentation can be arranged in the piston base next to a quench zone. The indentation has, at least in one area, an edge geometry as described above. The quench surface is indicated by shading. The indentation runs from the recess up to the piston skirt. Therefore, by means of this entire channel-shaped length of the indentation, there is the possibility for the flow to flow into or out of the gap. In addition, breaking up possible eddy currents is realized by the edge formation.

In FIG. 11, another possible development is shown schematically. Here, an indentation projects outward from the recess, but without reaching up to the piston skirt. Instead, the indentation is separated from the piston skirt by a quench zone. The indentation in turn separates two valve pockets partially from each other.

The invention claimed is:

1. A vehicle piston internal combustion engine (10) with at least one cylinder and a piston (1) in the cylinder, said engine comprising:
   a piston having a recess (2) and at least two, preferably four quench zones, the quench zones separated at least partially from each other by valve pockets for valves;
   a cylinder head having a roof shape that is complementary to a roof-shaped geometry of the piston (1) and that has a first and a second side intersecting in the shape of a gable;
   the piston (1) and the cylinder head defining a top and a bottom side of a combustion chamber, with an ignition device, which is arranged at least approximately in the center in the roof shape, and with preferably two inlet valves (5), which are arranged in the first side (6), and with preferably two outlet valves (4), which are arranged in the second side (7):
   the recess (2) extending over both the first side and the second side of the roof shape and having a base, sides that descend approximately vertically to the base, and an indentation;
   the indentation extending from the base, arranged between a first and a second valve pocket. transitioning into a quench zone, and having at least one edge that breaks up a flow.

2. The vehicle piston internal combustion engine (10) according to claim 1, wherein at least one valve pocket completely separates two quench zones.

3. The vehicle piston internal combustion engine (10) according to claim 1, wherein the valve pocket has a depth of at least 5 millimeters.

4. The vehicle piston internal combustion engine (10) according to claim 1, wherein a percentage of the quench zones relative to the total surface area of the piston in a top view onto the piston equals between 20% to 40%.

5. The vehicle piston internal combustion engine (10) according to claim 1, wherein a valve pocket is constructed with sharp edges at least in one flow area.

6. The vehicle piston internal combustion engine (10) according to claim 1, wherein an indentation, which extends outwards from the recess and has at least one edge that breaks tip a flow, is arranged in the piston base at least next to a quench zone.

7. The vehicle piston internal combustion engine (10) according to claim 6, wherein the indentation is arranged in the shape of a channel between a first and a second quench zone and transitions into at least one of the quench zones.

8. The vehicle piston internal combustion engine (10) according to claim 1, wherein the recess (2) is arranged approximately in the center in the piston (1).

9. The vehicle piston internal combustion engine (10) according to claim 1, wherein inlet channels (8), which run parallel to each other and open into the combustion chamber, are assigned at least to the inlet valves (5).

10. The vehicle piston internal combustion engine (10) according to claim 1, wherein outlet channels (8), which run parallel to each other and open into the combustion chamber, are assigned at least to the outlet valves (4).

11. The vehicle piston internal combustion engine (10) according to claim 1, wherein a fuel inflow device is arranged in the roof shape close to a gable on the outlet-valve side, through which an axis of a fuel flow runs at an angle so that the axis crosses an ignition device axis in the region of the roof shape in the cylinder head.

12. The vehicle piston internal combustion engine (10) according to claim 11, wherein the axis of the fuel flow is inclined in the direction of the inlet valves (5).

13. The vehicle piston internal combustion engine (10) according to claim 1, wherein the quench zones are separated.

14. The vehicle piston internal combustion engine (10) according to claim 1, wherein this is a gas motor.

15. The vehicle piston internal combustion engine (10) according to claim 1, wherein said engine is a lean-mix engine in a vehicle without an Nox catalytic converter.

16. A combustion process of a piston internal combustion engine (10) with at least one cylinder and a piston (1) in the cylinder, wherein the piston has a recess (2), and with a cylinder head, which has a roof shape that is complementary to a roof-shaped geometry of the piston (1) and that has a first and a second side intersecting in the shape of a gable, wherein the piston (1) and the cylinder head define a top and a bottom side of a combustion chamber, with an ignition device, which is arranged at least approximately in the center of the roof shape, and with preferably two inlet valves (5), which are arranged in the first side (6), and with preferably two outlet valves (4), which are arranged in the second side (7), wherein the recess (2) extends over both sides, wherein the recess (2) comprises sides descending approximately vertically at the sides and a base, and the piston has at least two, preferably four quench zones, which are separated at least partially from each other by valve pockets for valves, the process comprising the steps of:
   breaking up a global tumbling motion of a flow in a combustion space during a compression stroke using edges formed at least by a recess (2) in a piston base, the breaking up of the global tumbling motion of the flow producing a turbulent flow;
   flowing the turbulent flow into a narrowing gap between a piston roof and quench zones in the piston base;
   flowing the turbulent flow out of the narrowing gap between the piston roof and quench zones in the piston base before the piston reaches TDC; and continuing to flow fuel into and out of the narrowing gap between the piston roof and quench zones, in which at TUC a compression ratio between 11 and 16 is set in the combustion space.

17. The combustion process according to claim 16, wherein a concentration of the combustion takes place underneath and around the ignition device arranged approximately in the center.

18. The combustion process according to claim 16, wherein a flow out of the gap between the quench zone and the combustion space roof reaches its maximum velocity between 23° and 10° before TDC.

19. The combustion process according to claim 16, wherein a flow into the gap between the quench zone and the combustion space roof reaches its maximum velocity between 10° and 23° after TDC.

20. The combustion process according to claim 16, wherein edges of the recess are cooled in a suction stroke by incoming air.

21. The combustion process according to claim 16, wherein under a partial load, a layered charge is set in the combustion space.

22. The combustion process according to claim 16, wherein charged air is fed into the combustion space.

* * * * *